US012401155B2

(12) United States Patent
Ito et al.

(10) Patent No.: US 12,401,155 B2
(45) Date of Patent: Aug. 26, 2025

(54) CONNECTOR

(71) Applicant: SUMITOMO WIRING SYSTEMS, LTD., Mie (JP)

(72) Inventors: Yusuke Ito, Mie (JP); Tomoaki Yasuda, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 378 days.

(21) Appl. No.: 17/989,106

(22) Filed: Nov. 17, 2022

(65) Prior Publication Data

US 2023/0163514 A1 May 25, 2023

(30) Foreign Application Priority Data

Nov. 24, 2021 (JP) ................................ 2021-190339

(51) Int. Cl.
*H01R 13/447* (2006.01)
*H01R 13/52* (2006.01)

(52) U.S. Cl.
CPC ....... *H01R 13/5202* (2013.01); *H01R 13/447* (2013.01)

(58) Field of Classification Search
None
See application file for complete search history.

(56) References Cited

U.S. PATENT DOCUMENTS

| | | | | | |
|---|---|---|---|---|---|
| 4,820,191 | A * | 4/1989 | Lacroix | H01R 4/2491 | 439/417 |
| 5,499,930 | A * | 3/1996 | Cieri | H01R 12/67 | 439/417 |
| 5,964,613 | A * | 10/1999 | Huang | F21V 21/32 | 439/417 |
| 6,213,808 | B1 * | 4/2001 | Whatmore | H01R 13/516 | 439/417 |
| 7,635,279 | B1 * | 12/2009 | Wong | H01R 4/2408 | 439/419 |
| 9,887,469 | B1 * | 2/2018 | King, Jr. | H01R 4/2454 | |
| 2017/0149167 | A1 | 5/2017 | Ito et al. | | |

FOREIGN PATENT DOCUMENTS

| | | | |
|---|---|---|---|
| JP | H01-076123 | U | 5/1989 |
| JP | H07-161411 | A | 6/1995 |
| JP | 2020-080237 | A | 5/2020 |

* cited by examiner

*Primary Examiner* — Tho D Ta
(74) *Attorney, Agent, or Firm* — Venjuris, P.C.

(57) ABSTRACT

Provided is a connector with which waterproofness can be ensured. The connector includes: a housing main body 23 which includes terminal housing chambers 59 and an upper surface of which is closed off; terminal metal fittings 11 that are housed inside the terminal housing chambers 59; a cover 15 that is locked to the housing main body 23 and arranged below the terminal housing chambers 59; and eaves portions 62 that protrude laterally from an upper end of the housing main body 23.

7 Claims, 13 Drawing Sheets

CONNECTOR

CROSS-REFERENCE TO RELATED APPLICATIONS

This application is based on and claims priority from Japanese Patent Application No. 2021-190339, filed on Nov. 24, 2021, with the Japan Patent Office, the disclosure of which is incorporated herein in its entirety by reference.

TECHNICAL FIELD

The present disclosure relates to a connector.

BACKGROUND

A connector disclosed in JP H7-161411A includes a male connector housing and a female connector housing that can be fitted to one another. The male connector housing and the female connector housing each have terminal housing chambers formed therein. Note that techniques relating to connectors are also disclosed in JP H1-76123U, JP 2017-98019A, and JP 2020-80237A.

SUMMARY

In the case of JP H7-16141 IA, in a state of use, the male connector housing is arranged on the upper side, and the female connector housing is arranged on the lower side. Furthermore, the terminal housing chambers of the two connector housings are arranged along the up-down direction. Rubber stoppers are housed inside the terminal housing chambers. However, if the rubber stoppers deteriorate or are damaged, water infiltrates into the terminal housing chambers and waterproofness cannot be ensured.

In contrast, if the upper surface of the male connector housing is closed off, the infiltration of water into terminal housing chambers can be prevented. However, if a cover is arranged below the terminal housing chambers and a gap is formed between the cover and the male connector housing, there is a concern that water may infiltrate into the terminal housing chambers through the gap.

In view of this, an object of the present disclosure is to provide a connector with which waterproofness can be ensured.

A connector according to the present disclosure includes: a housing main body which includes a terminal housing chamber and an upper surface of which is closed off; a terminal metal fitting that is housed inside the terminal housing chamber, a cover that is locked to the housing main body and arranged below the terminal housing chamber, and an eaves portion that protrudes laterally from an upper end of the housing main body.

According to the present disclosure, a connector with which waterproofness can be ensured can be provided.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
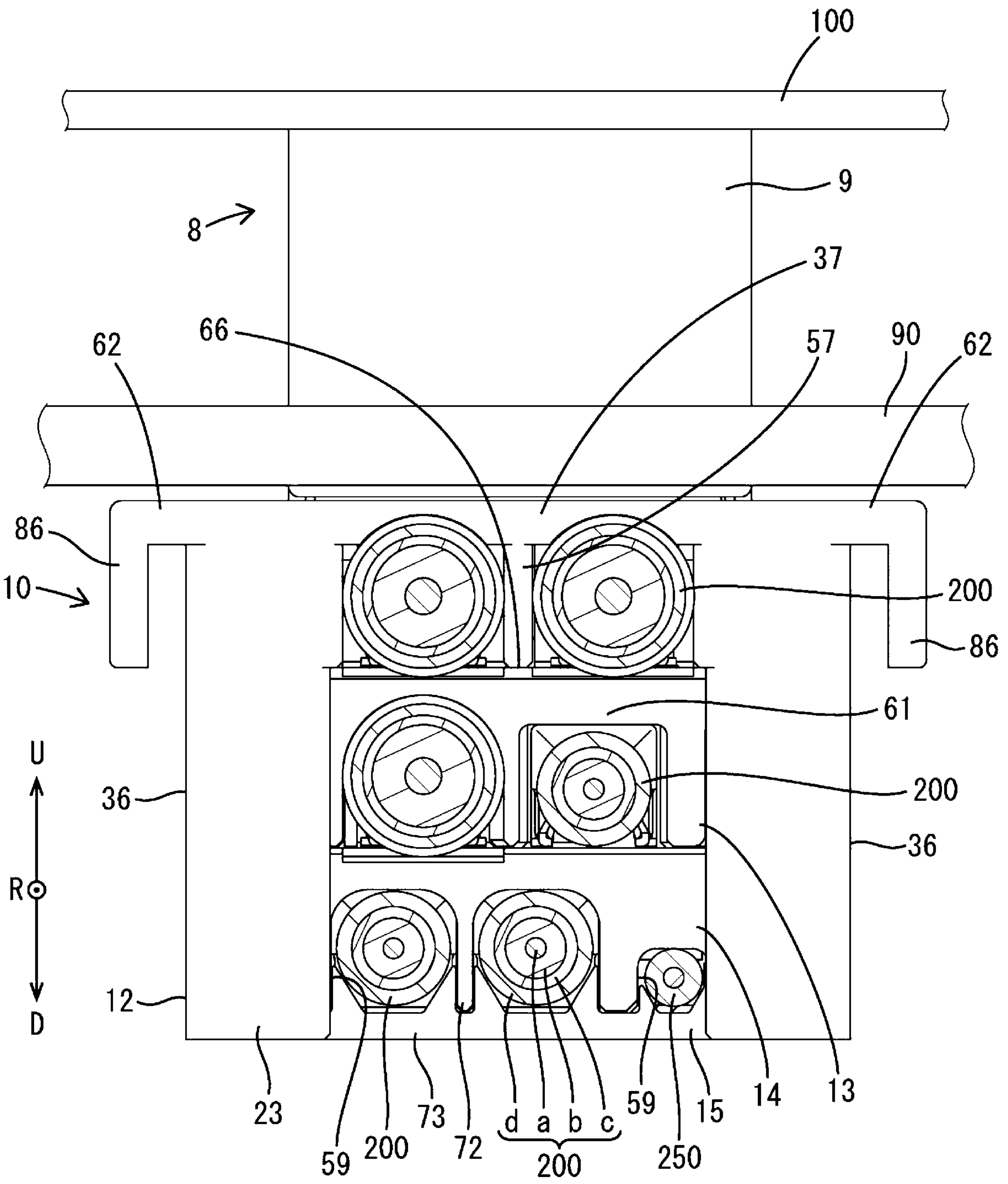
FIG. 1 is a rear view of a connector fitted to a mating connector in embodiment 1 of the present disclosure.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

First, aspects of the present disclosure will be listed and described.

(1) A connector according to the present disclosure includes: a housing main body which includes a terminal housing chamber and an upper surface of which is closed off; a terminal metal fitting that is housed inside the terminal housing chamber; a cover that is locked to the housing main body and arranged below the terminal housing chamber, and an eaves portion that protrudes laterally from an upper end of the housing main body.

According to the above-described configuration, the infiltration of water into the terminal housing chamber through a gap between the cover and the housing main body can be prevented because the upper surface of the housing main body is closed off and the eaves portion protrudes laterally from the upper end of the housing main body.

(2) Preferably, the eaves portion is shaped so as to protrude laterally further than a locked portion where the housing main body and the cover are locked to one another does, above the locked portion.

Although a gap is formed in the locked portion where the housing main body and the cover are locked to one another, the infiltration of water into the gap can be avoided because the eaves portion protrudes laterally above the locked portion according to the above-described configuration.

(3) Preferably, an upper surface of the eaves portion is continuous with the upper surface of the housing main body without any level differences.

According to the above-described configuration, water falling on the upper surface of the housing main body is allowed to move smoothly onto the upper surface of the eaves portion.

(4) Preferably, a hanging-down portion that protrudes downward from a laterally-protruding end side of the eaves portion is included.

According to this configuration, the infiltration of water into the terminal housing chamber of the housing main body can be more reliably prevented because water is allowed to fall down along the hanging-down portion from the upper surface of the eaves portion.

(5) Preferably, the housing main body includes a pair of locking walls, and a cover housing portion an upper surface of which is closed off is formed between the pair of locking walls in the housing main body, and the cover is arranged inside the cover housing portion, and includes lateral walls that face inner surfaces of the locking walls and that are locked to the locking walls.

Although gaps are formed between the lateral walls and the locking walls, the infiltration of water into the gaps can be avoided because the lateral walls of the cover are arranged so as to face the inner surfaces of the locking walls of the housing main body inside the cover housing portion according to the above-described configuration.

Preferably, the connector is a connector that is provided to a roof panel of a vehicle, and the eaves portion is arranged along a lower surface of the roof panel.

According to the above-described configuration, the infiltration of water into the terminal housing chamber of the housing main body can be prevented because dew on the roof panel is allowed to freely fall directly from the eaves portion.

DETAILS OF EMBODIMENTS OF PRESENT DISCLOSURE

Specific examples of embodiment of the present disclosure will be described below with reference to the drawings. Note that the present invention is not limited to these examples, and is intended to include all modifications that are indicated by the claims and are within the meaning and scope of equivalents of the claims.

Embodiment 1

Figure 2:
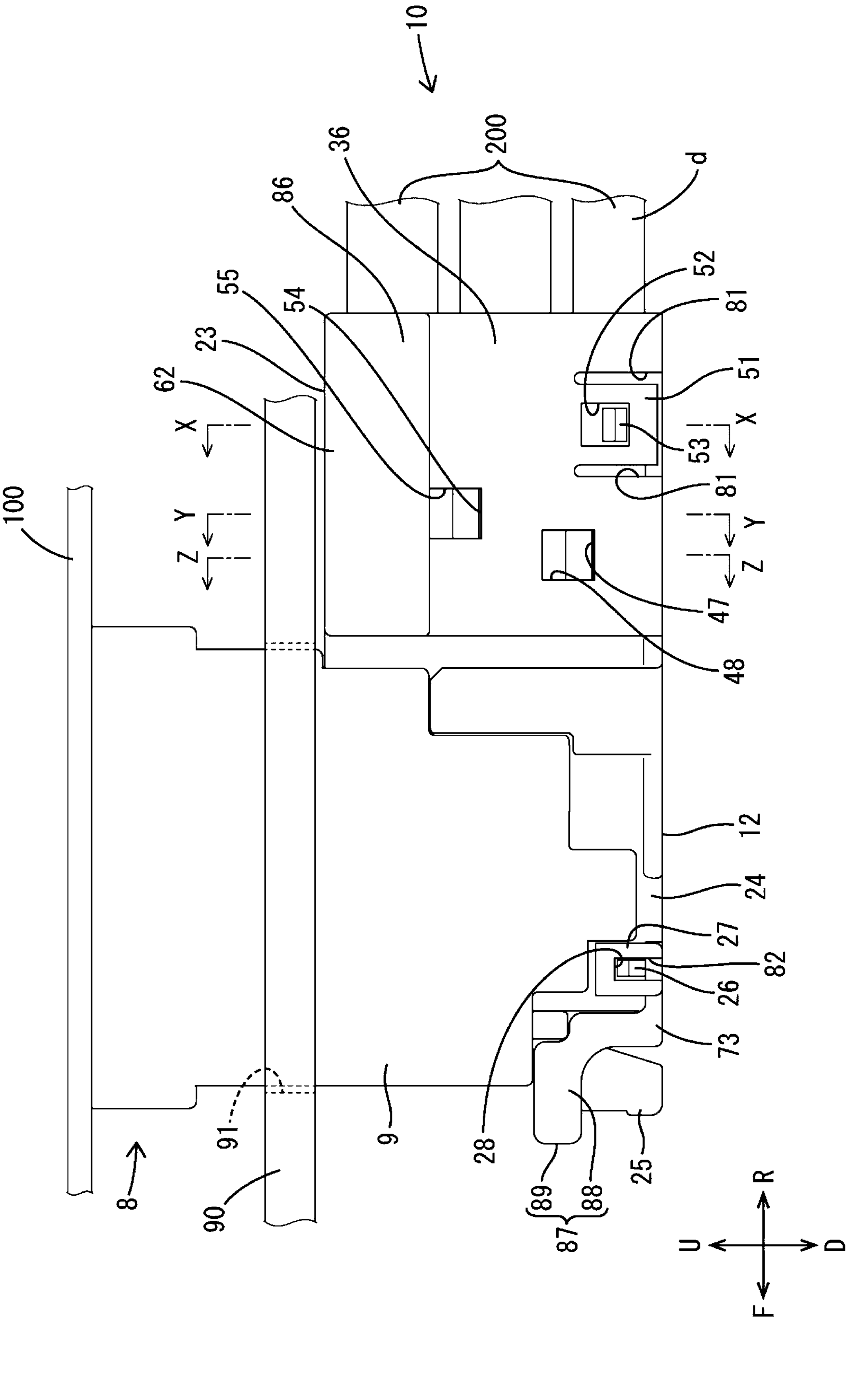
FIG. 2 is a lateral view of the connector fitted to the mating connector.
Figure 6:
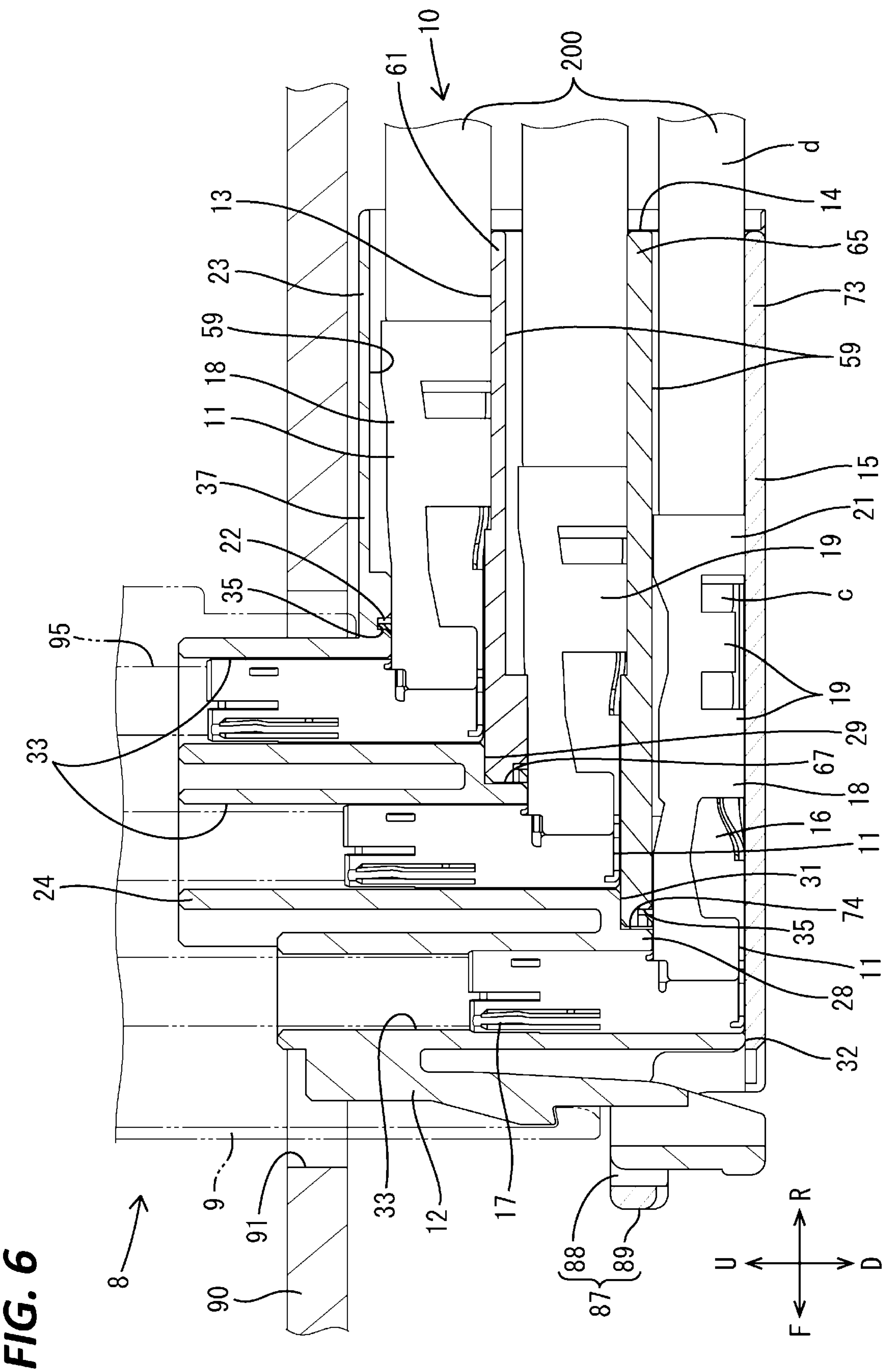
FIG. 6 is a lateral cross-sectional view of the connector.

As illustrated in FIGS. 1 and 2, a connector 10 according to embodiment 1 of the present disclosure is arranged below a roof panel 90 of a vehicle such as an automobile, which is not illustrated in entirety. In other words, the connector 10 is arranged inside the vehicle. A mating connector 8 that is connected to a circuit board 100 is arranged above the roof panel 90, or in other words, outside the vehicle. As illustrated in FIGS. 2 and 6, the connector 10 and the mating connector 8 are fitted to one another through an opening 91 having a rectangular cross-sectional shape that is formed in the roof panel 90. The connector 10 includes terminal metal fittings 11, a housing 12, an upper inner member 13, a lower inner member 14, and a cover 15. The terminal metal fittings 11 are connected to terminal portions of electric wires 200. The electric wires 200 are routed along the lower surface of the roof panel 90.

In the following description, note that, in regard to the front-rear direction, the side in which the terminal metal fittings 11 are connected to the electric wires 200 is the front side. In FIGS. 2, 6, and 7, and FIGS. 9 to 13, the reference symbol F is the front side. The reference symbol R is the rear side. In regard to the up-down direction, the side in which the mating connector 8 is located relative to the connector 10 is the upper side. In FIGS. 1, 2, 6, and 7, and FIGS. 10 to 13, the reference symbol U is the upper side. The reference symbol D is the lower side. The up-down direction corresponds to the vertical direction (direction of gravity), and matches the up-down direction in a state of use in present embodiment 1.

Terminal Metal Fittings

Figure 7:
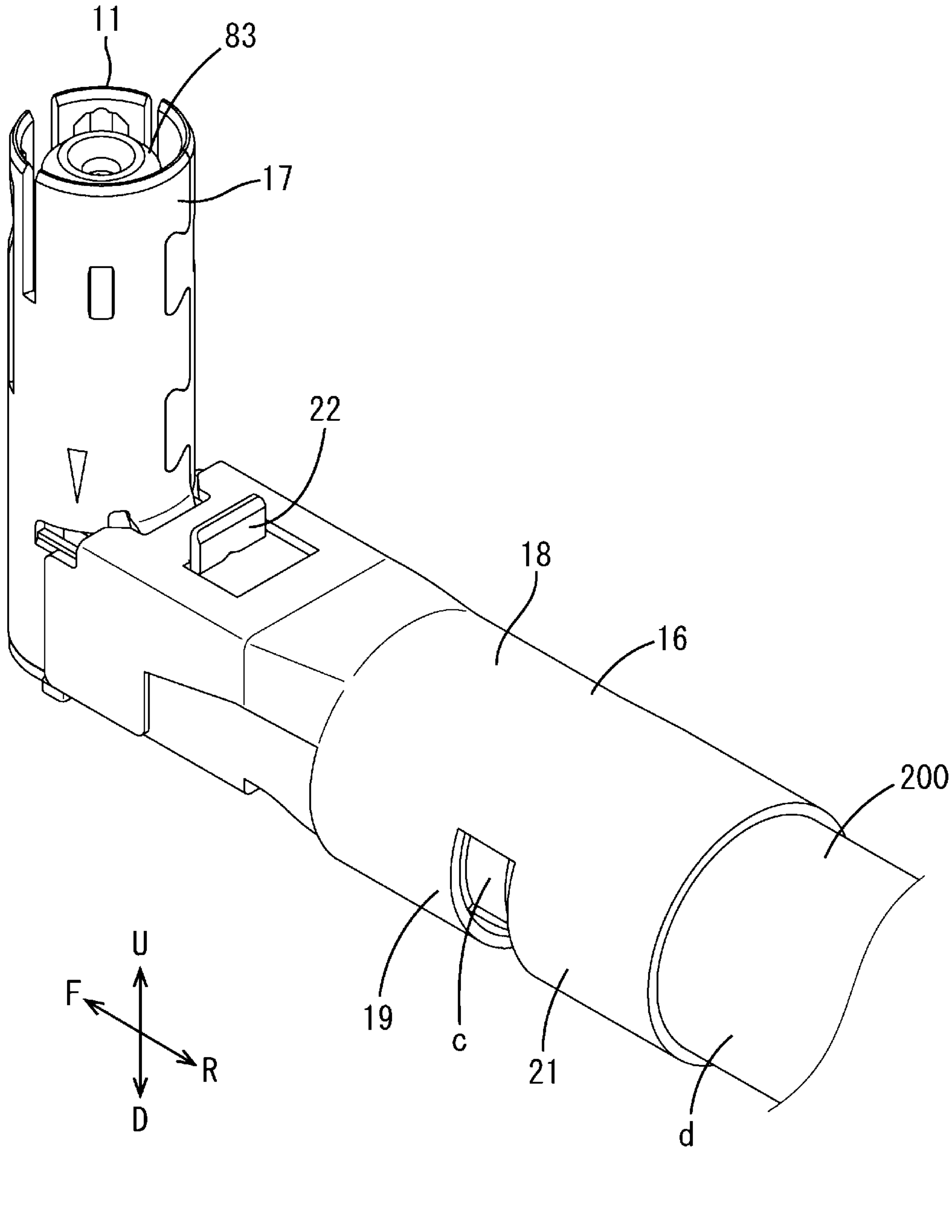
FIG. 7 is a perspective view of a terminal metal fitting connected to an end portion of an electric wire.

Each terminal metal fitting 11 is a shield terminal, and has an L-shape in a lateral view, as illustrated in FIG. 7. The terminal metal fitting 11 includes an unillustrated electroconductive inner conductor, an electroconductive outer conductor 16, and an insulating dielectric member 83 (see FIG. 7) that is arranged between the inner conductor and the outer conductor 16. The inner conductor and the outer conductor 16 are electrically insulated from one another with the dielectric member 83 therebetween. The outer conductor 16 includes a cylinder portion 17 whose axis is oriented in the up-down direction, and an extension portion 18 that intersects the cylinder portion 17 and extends toward the rear. In the rear part of the extension portion 18, a sheath barrel 21 and a shield barrel 19 forming an open barrel shape are formed so as to be arranged one in front of the other. Although not described in detail, the terminal metal fittings 11 consist of large-diameter shield terminals including one shield barrel 19 (the terminal metal fittings 11 in the middle and upper tiers in FIG. 6) and small-diameter shield terminals including two shield barrels 19 (the terminal metal fitting 11 in the lower tier in FIG. 6).

Each electric wire 200 is a coaxial cable, and, as illustrated in FIG. 1, includes an electroconductive core wire a, an insulating coating b that covers the outer circumference of the core wire a, an electroconductive shield portion c made from a braided wire or the like that covers the outer circumference of the coating b, and an insulating sheath d that covers the outer circumference of the shield portion c. In the terminal portion of the electric wire 200, the shield portion c is exposed as a result of the sheath d being removed, and furthermore, the core wire a is exposed as a result of the coating b being removed.

As illustrated in FIG. 7, the shield barrel 19 is crimped and electrically connected to the shield portion c of an electric wire 200 from over a sleeve 85. The sheath barrel 21 is crimped and mechanically connected to the sheath d of the electric wire 200. In the upper wall portion in the front part of the extension portion 18, a protruding piece 22 is formed by being cut out and raised.

Although not illustrated, the rear part of the inner conductor is crimped and electrically connected to the core wire a of the electric wire 200. Furthermore, the front part of the inner conductor is arranged along the up-down direction inside the cylinder portion 17 together with the front part of the dielectric member 83, and is electrically connected to a mating inner conductor of a mating terminal metal fitting 95 (see FIG. 6) that is attached to the mating connector 8.

Note that the connector 10 also includes an unillustrated general terminal that does not have a shield function and that is entirely made from an electroconductive metal plate. The general terminal is connected to a coated electric wire 250 (see FIG. 1) that does not include the shield portion c, and is also connected to an unillustrated tab that is attached to the mating connector 8.

Housing

Figure 9:
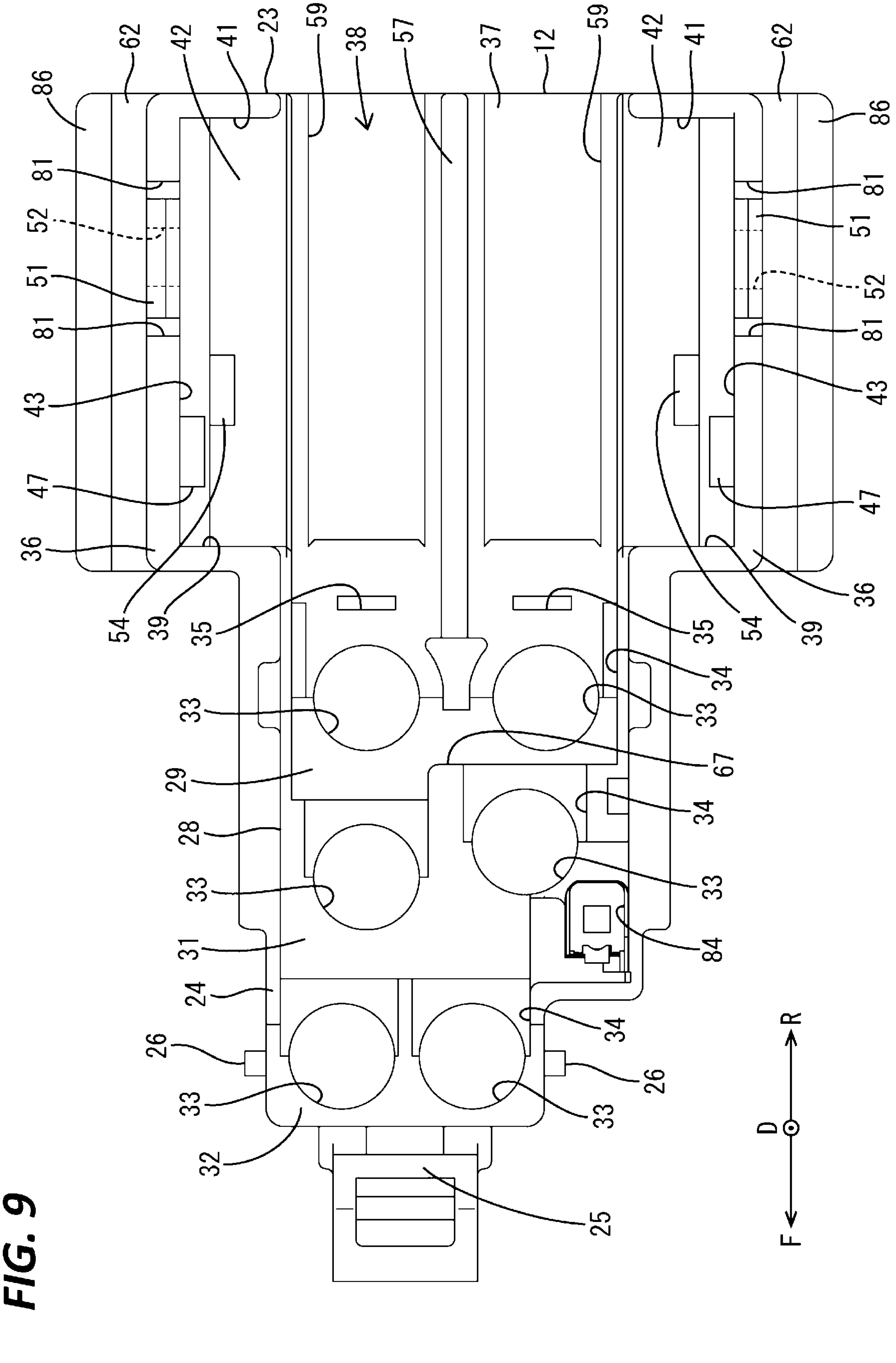
FIG. 9 is a bottom view of the housing.

The housing 12 is made from synthetic resin, and has an L-shape in a lateral view, as illustrated in FIG. 6. The housing 12 includes a housing main body 23 in the rear part thereof, and includes a fitting portion 24 in the front part thereof. The height of the housing main body 23 is lower than the height of the fitting portion 24. As illustrated in FIG. 9, the width of the housing main body 23 is larger than the width of the fitting portion 24.

Figure 10:
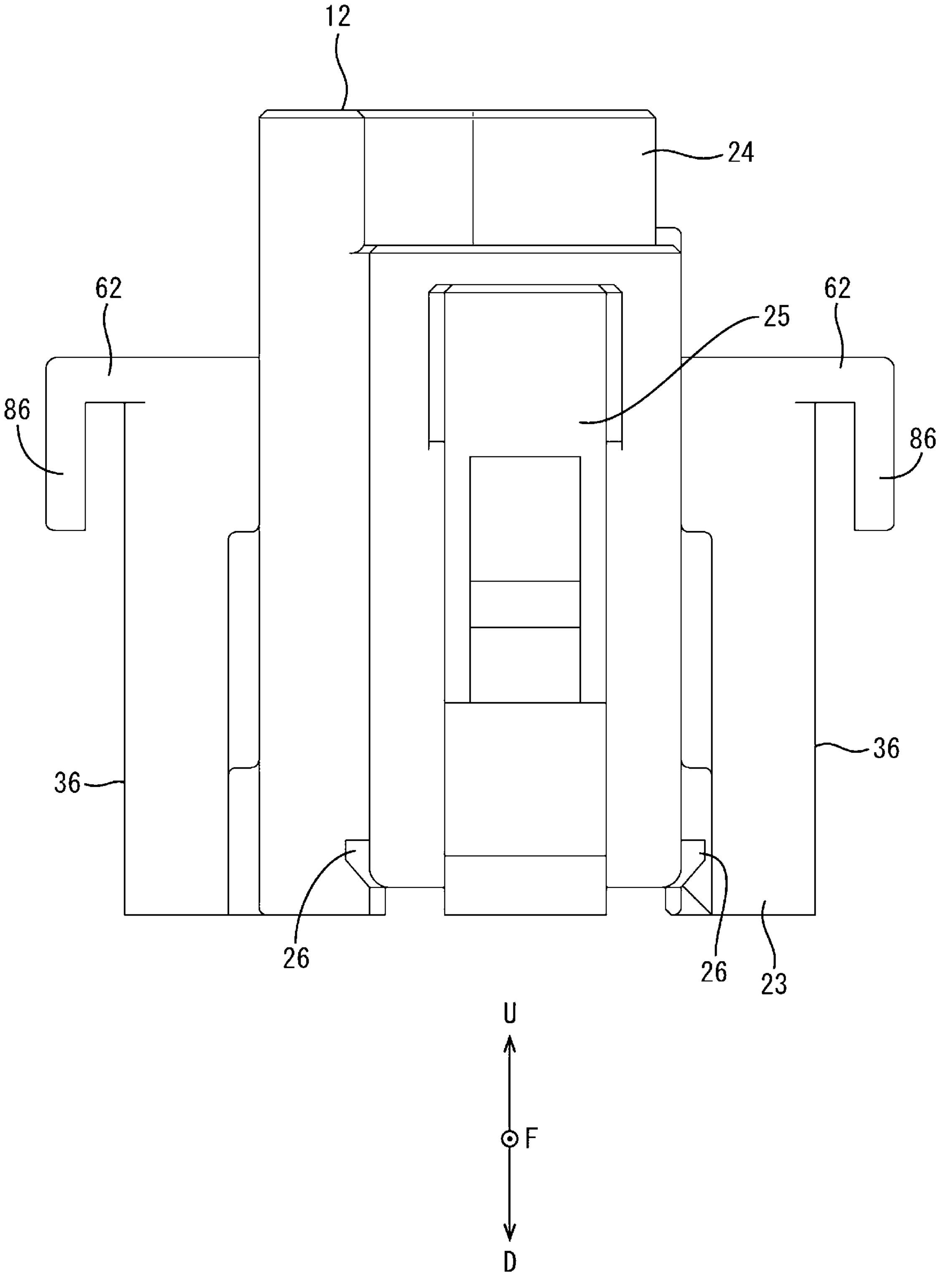
FIG. 10 is a front view of the housing.

As illustrated in FIG. 6, the fitting portion 24 is fitted into guide walls 9 formed in the mating connector 8. As illustrated in FIGS. 9 and 10, a lock arm 25 that can deform by bending is formed on the front surface of the fitting portion 24. The lock arm 25 is formed so as to extend downward from the upper end portion of the fitting portion 24. The lock arm 25 can lock the mating connector 8. A pair of front-side locking portions 26 are formed on the lower end portions of the left and right outer lateral surfaces of the fitting portion 24. As illustrated in FIG. 2, front-side locked portions 27 of the cover 15 can be locked to the front-side locking portions 26.

Although not illustrated in detail, a staircase portion 28 (see FIGS. 6 and 9) that has the shape of a staircase in a lateral cross-sectional view is formed inside the fitting portion 24. The staircase portion 28 includes an upper-tier surface 29, a middle-tier surface 31, and a lower-tier surface 32 that become gradually lower in height from the rear toward the front. Furthermore, a plurality of terminal insertion holes 33 having circular cross-sectional shapes that extend in the up-down direction are formed inside the fitting portion 24. As illustrated in FIG. 6, the cylinder portion 17 of a terminal metal fitting 11 is inserted from below into each terminal insertion hole 33.

The rear-side terminal insertion holes 33 open to the upper-tier surface 29 of the staircase portion 28. The terminal insertion holes 33 between the front and rear sides open to the middle-tier surface 31 of the staircase portion 28. The front-side terminal insertion holes 33 open to the lower-tier surface 32 of the staircase portion 28.

As illustrated in FIG. 9, in the rear part of each of the upper-tier surface 29, the middle-tier surface 31, and the lower-tier surface 32 of the staircase portion 28, recesses 34 are formed at positions corresponding to the terminal insertion holes 33. In a surface that is continuous with the lower surface of a later-described upper wall 37 above the upper-tier surface 29, a pair of left and right protruding-piece receiving portions 35 that are open in the shape of slits are formed. As illustrated in FIG. 6, protruding pieces 22 of terminal metal fittings 11 are fitted into the protruding-piece receiving portions 35 and positioned relative to the housing 12. Note that portions into which protruding pieces 22 are fitted similarly to the protruding-piece receiving portions 35 are also formed in the upper inner member 13 and the lower inner member 14 (see FIG. 6).

Figure 3:
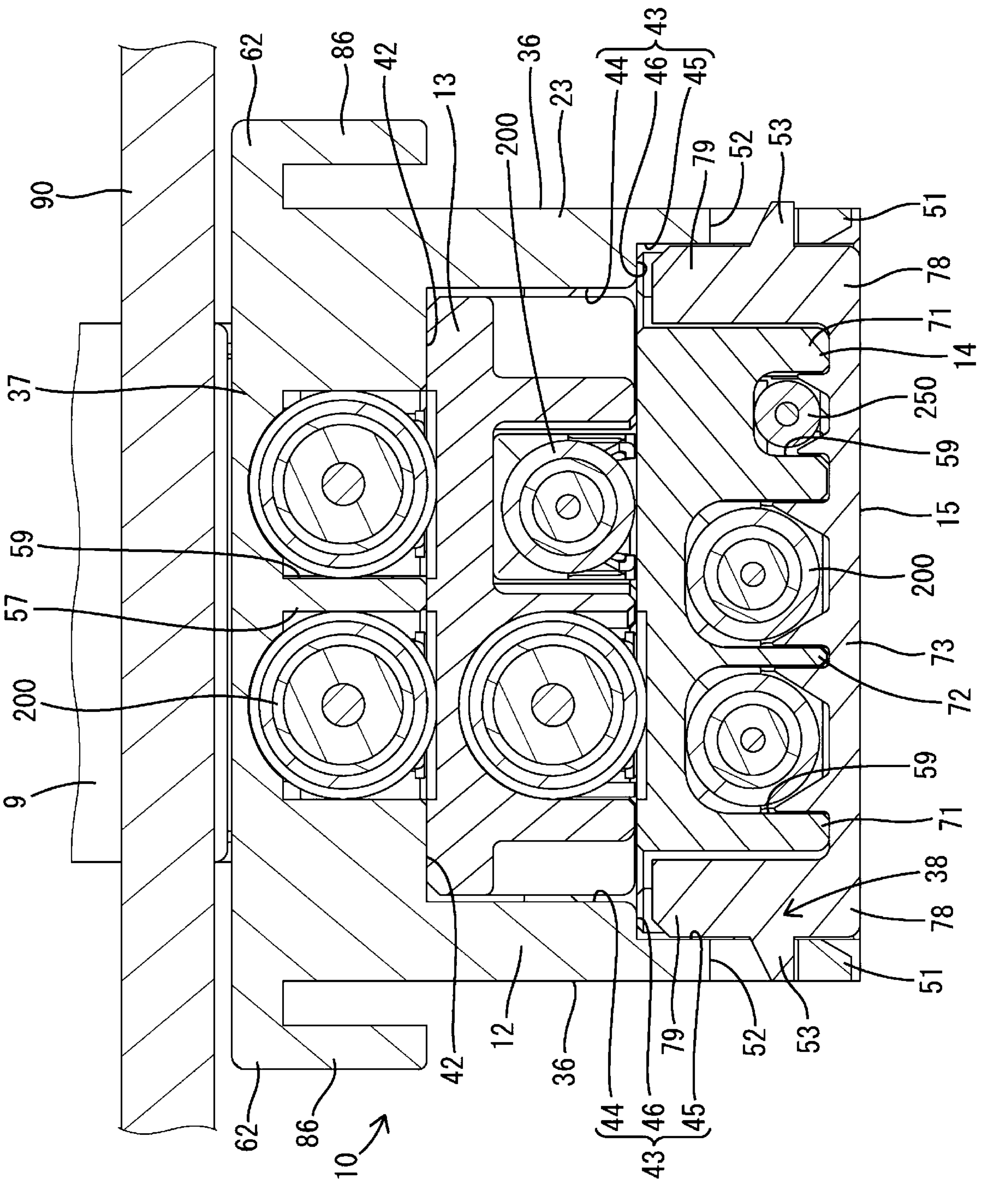
FIG. 3 is a cross-sectional view taken along line X-X in FIG. 2.
Figure 8:
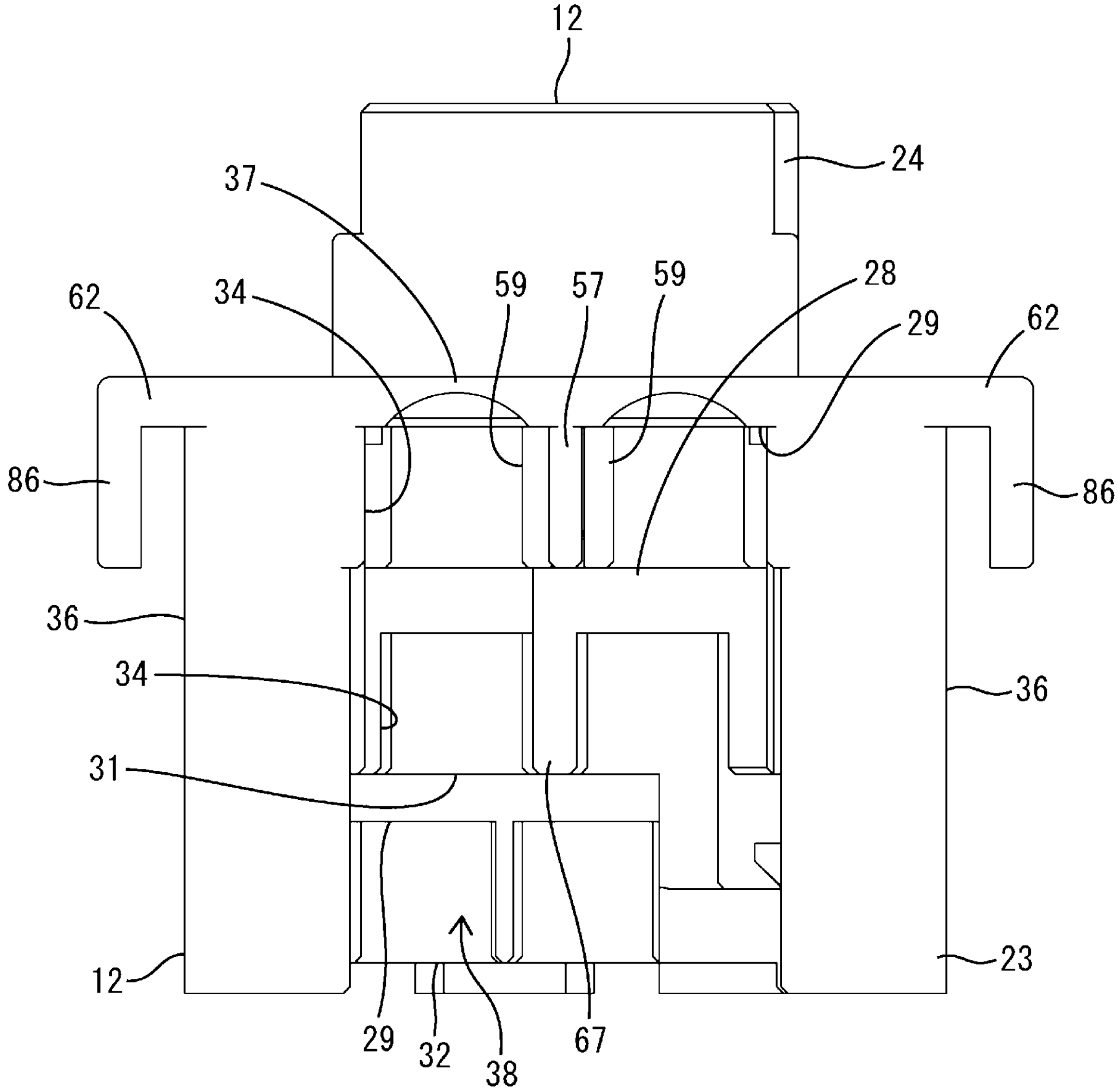
FIG. 8 is a rear view of a housing.

As illustrated in FIGS. 3 and 8, the housing main body 23 includes a pair of locking walls 36 that face one another in the left-right direction, and the upper wall 37, which is provided so as to extend across the upper ends of the locking walls 36. The left and right outer lateral surfaces of the locking walls 36 are arranged along the up-down direction. A cover housing portion 38 is formed between the locking walls 36 and below the upper wall 37 in the housing main body 23. As illustrated in FIG. 9, the upper surface of the cover housing portion 38 is closed off by the upper wall 37, and the lower and rear sides of the cover housing portion 38 are open. Furthermore, the cover housing portion 38 is formed so as to extend across the housing main body 23 and the fitting portion 24, and the front side of the cover housing portion 38 communicates with the terminal insertion holes 33 in the fitting portion 24.

As illustrated in FIG. 9, the locking walls 36 include front surface portions 39, rear surface portions 41, top surface portions 42, and lateral surface portions 43 that define the rear part of the cover housing portion 38. The front surface portions 39 orthogonally intersect and continue from the inner surfaces of the left and right lateral wall portions of the fitting portion 24. The rear surface portions 41 are arranged in the rear end side of the housing 12 so as to face the front surface portions 39. The top surface portions 42 each continue from the upper ends of a front surface portion 39 and a rear surface portion 41, and are arranged so as to be flat along the left-right direction as illustrated in FIG. 3.

As illustrated in FIG. 3, in the left and right inner lateral surfaces (inner surfaces) of the locking walls 36, the lateral surface portions 43 include upper portions 44 that are arranged on the upper side, lower portions 45 that are arranged on the lower side, and step portions 46 that are each arranged between an upper portion 44 and a lower portion 45. The upper portions 44 and the lower portions 45 are arranged along the up-down direction. The step portions 46 are arranged along the left-right direction. The lower portions 45 are located further outward toward the left and right than the upper portions 44 are as a result of the step portions 46 being interposed.

Figure 5:
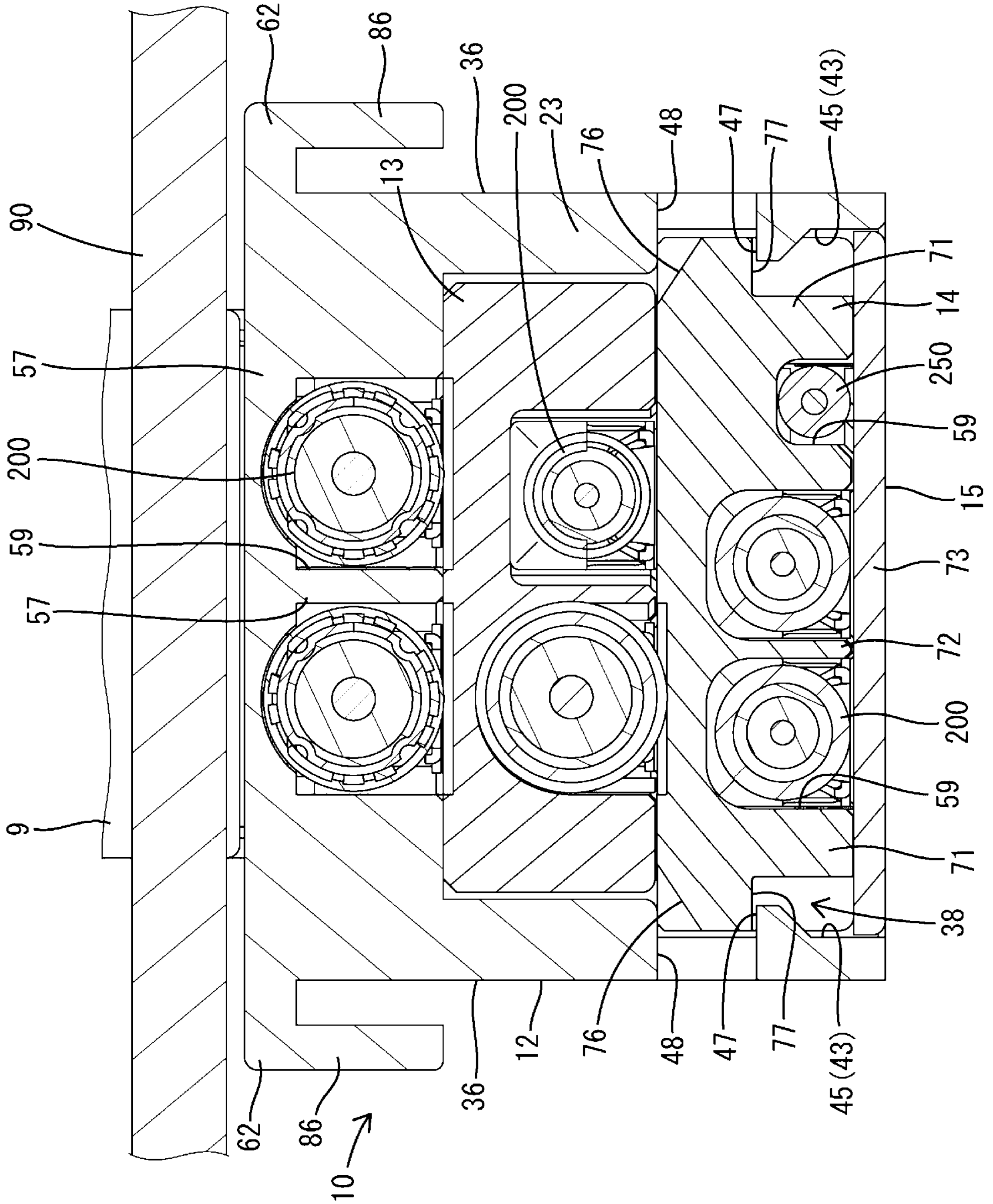
FIG. 5 is a cross-sectional view taken along line Z-Z in FIG. 2.

As illustrated in FIG. 5, lower inner lock portions 47 are formed in the lower portions 45 of the lateral surface portions 43 of the locking walls 36. As illustrated in FIG. 5, the lower inner lock portions 47 have the shape of tabs, protrude laterally from the main body portions of the lower portions 45, and are arranged inside the cover housing portion 38. Lower-tier extraction holes 48 are formed in the locking walls 36 at positions corresponding to the front sides of the lower portions 45 (see FIG. 2). The lower-tier extraction holes 48 are formed as a result of unillustrated molds for forming the upper surfaces of the lower inner lock portions 47 being extracted.

As illustrated in FIG. 2, locking portions 51 are formed in the locking walls 36 rearward of the lower inner lock portions 47. The locking portion 51 have the shape of rectangular frames, and are formed between a pair of front and rear slits 81, which are formed so as to extend upward from the lower ends of the locking walls 36, so that the locking portions 51 can deform by bending in the left-right direction. In the center of each locking portion 51, a locking hole 52 having a rectangular cross-sectional shape is formed so as to extend through the locking portion 51. The inner ends of the locking holes 52 open to the lower portions 45. As illustrated in FIG. 3, later-described locked portions 53 of the cover 15 can be fitted into the locking holes 52 in the locking portions 51.

Figure 4:
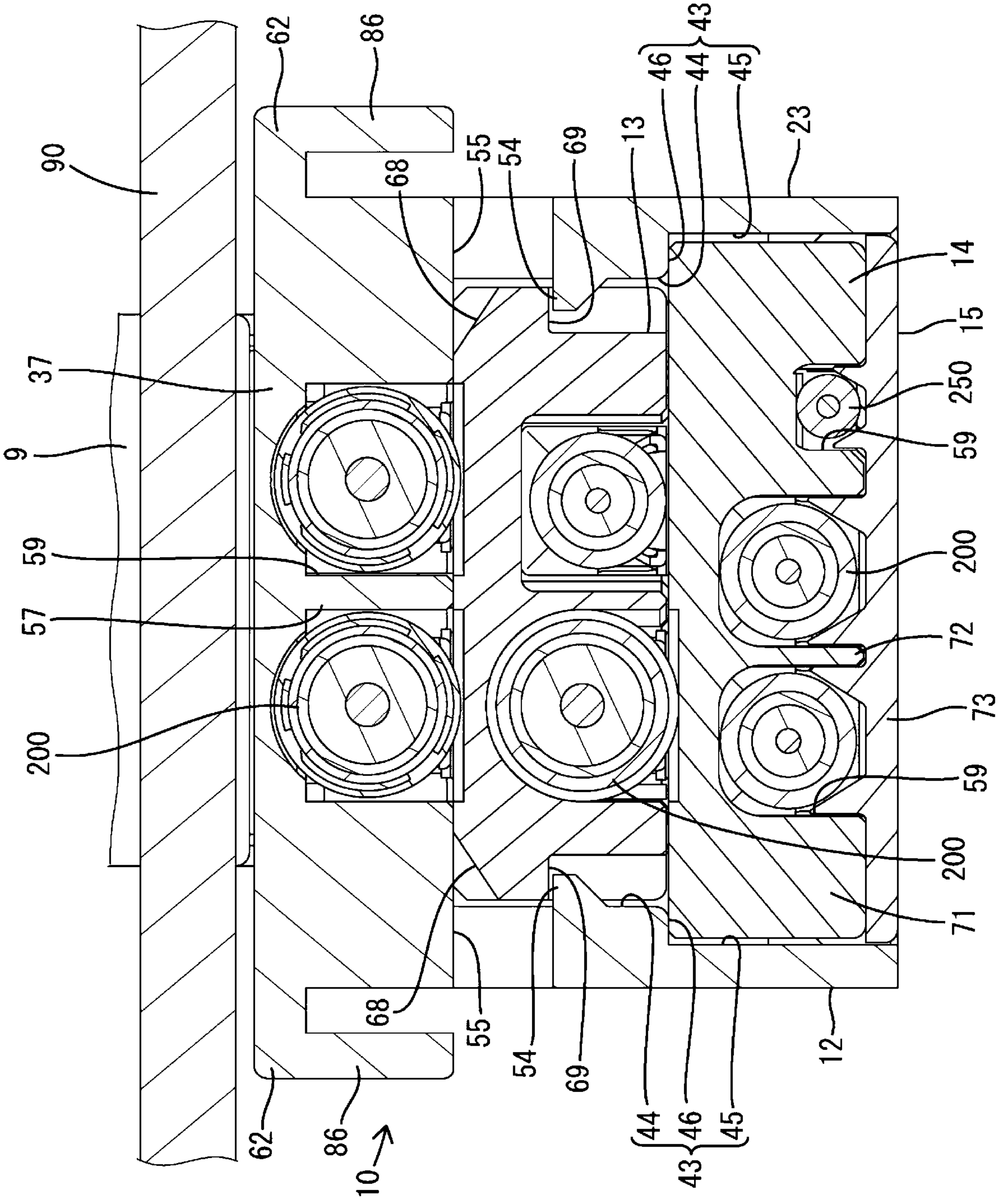
FIG. 4 is a cross-sectional view taken along line Y-Y in FIG. 2.

As illustrated in FIG. 2, upper inner lock portions 54 are formed in the upper portions 44 of the lateral surface portions 43 of the locking walls 36. As illustrated in FIG. 4, the upper inner lock portions 54 have the shape of tabs, protrude laterally from the main body portions of the upper portions 44, and are arranged inside the cover housing portion 38. Upper-tier extraction holes 55 are formed in the locking walls 36 at positions corresponding to between the front and rear sides of the upper portions 44. The upper-tier extraction holes 55 are formed as a result of unillustrated molds for forming the upper surfaces of the upper inner lock portions 54 being extracted.

The upper surface of the upper wall 37 is formed so as to be flat along the front-rear direction and the left-right direction. As illustrated in FIG. 9, a partition wall 57 is formed so as to protrude from a middle portion between the left and right sides of the lower surface of the upper wall 37. The partition wall 57 is formed so as to extend in the front-rear direction from the housing main body 23 to the fitting portion 24. A pair of left and right terminal housing chambers 59 are formed between the partition wall 57 and the lateral surface portions 43 below the upper wall 37. As illustrated in FIG. 6, the lower sides of the terminal housing chambers 59 are closed off by a later-described upper base portion 61 of the upper inner member 13. The extension portions 18 of the terminal metal fittings 11 in the upper tier are arranged in the terminal housing chambers 59.

Furthermore, as illustrated in FIG. 8, the housing main body 23 includes a pair of eaves portions 62 that protrude from the upper end of the housing main body 23 toward the left and right outer sides (laterally). The eaves portions 62 are long in the front-rear direction, and are formed to have rectangular shapes in a plan view. The upper surfaces of the eaves portions 62 are arranged along the front-rear direction and the left-right direction, and are continuous with the upper surface of the upper wall 37 without any level differences. The left and right outer protruding ends (outer ends) of the eaves portions 62 form the outermost ends of the housing 12 in the left-right direction. In other words, the eaves portions 62 are shaped so as to protrude laterally further than the left and right outer lateral surfaces of the locking walls 36 do, above the locking walls 36.

Furthermore, as illustrated in FIG. 8, the housing main body 23 includes a pair of hanging-down portions 86 that protrude downward from the protruding end sides of the eaves portions 62. The left and right surfaces of the hanging-down portions 86 are arranged along the up-down direction. As illustrated in FIG. 2, the hanging-down portions 86 have the shape of rectangular plates that are long in the front-rear direction in a lateral view, and are formed over the entire front-rear-direction length of the eaves portions 62. The length in which the hanging-down portions 86 protrude downward is set so as to be greater than the length in which the eaves portions 62 protrude laterally.

Upper Inner Member

Figure 11:
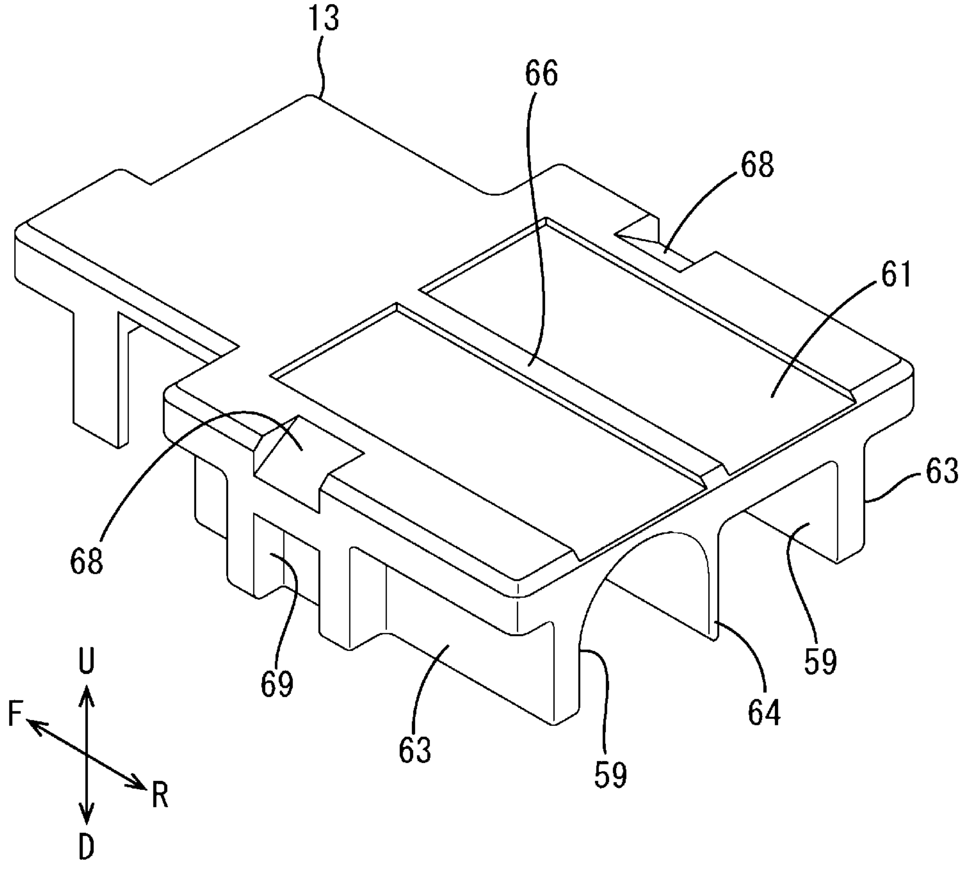
FIG. 11 is a perspective view of an upper inner member.

The upper inner member 13 is made from synthetic resin, and, as illustrated in FIG. 11, includes the upper base portion 61 having the shape of a flat plate, a pair of upper lateral walls 63 protruding downward from the left and right outer ends of the upper base portion 61, and an upper partition wall 64 that protrudes downward from the center of the upper base portion 61 between the left and right sides. As illustrated in FIG. 6, the upper inner member 13 is attached to the inside of the housing 12, and is arranged between the terminal metal fittings 11 in the upper tier and the terminal metal fittings 11 in the middle tier. A pair of left and right terminal housing chambers 59 are formed between the upper partition wall 64 and the upper lateral walls 63 below the upper base portion 61. As illustrated in FIG. 6, the lower sides of the terminal housing chambers 59 are closed off by a later-described lower base portion 65 of the lower inner member 14. The extension portions 18 of the terminal metal fittings 11 in the middle tier are arranged in the terminal housing chambers 59.

As illustrated in FIG. 11, a rib 66 that extends along the front-rear direction is formed in the center of the upper surface of the upper base portion 61 between the left and right sides. As illustrated in FIG. 1, the rib 66 of the upper base portion 61 is arranged so as to be capable of coming into contact with the lower end of the partition wall 57 along the front-rear direction. As illustrated in FIG. 6, the front end of the upper base portion 61 is arranged so as to be capable of coming into contact with a middle-tier wall surface 67 of the staircase portion 28 inside the fitting portion 24.

As illustrated in FIG. 11, upper guide portions 68 having the shape of slopes are formed by chamfering the left and right outer ends of the upper surfaces of the upper lateral walls 63. Furthermore, upper inner lock receiving portions 69 are formed below the upper guide portions 68 of the upper lateral walls 63. The upper inner lock receiving portions 69 have the shape of quadrilateral recesses, and are open toward the lower side of the upper lateral walls 63. As illustrated in FIG. 4, the upper inner lock receiving portions 69 can be locked to the upper inner lock portions 54.

Lower Inner Member

Figure 12:
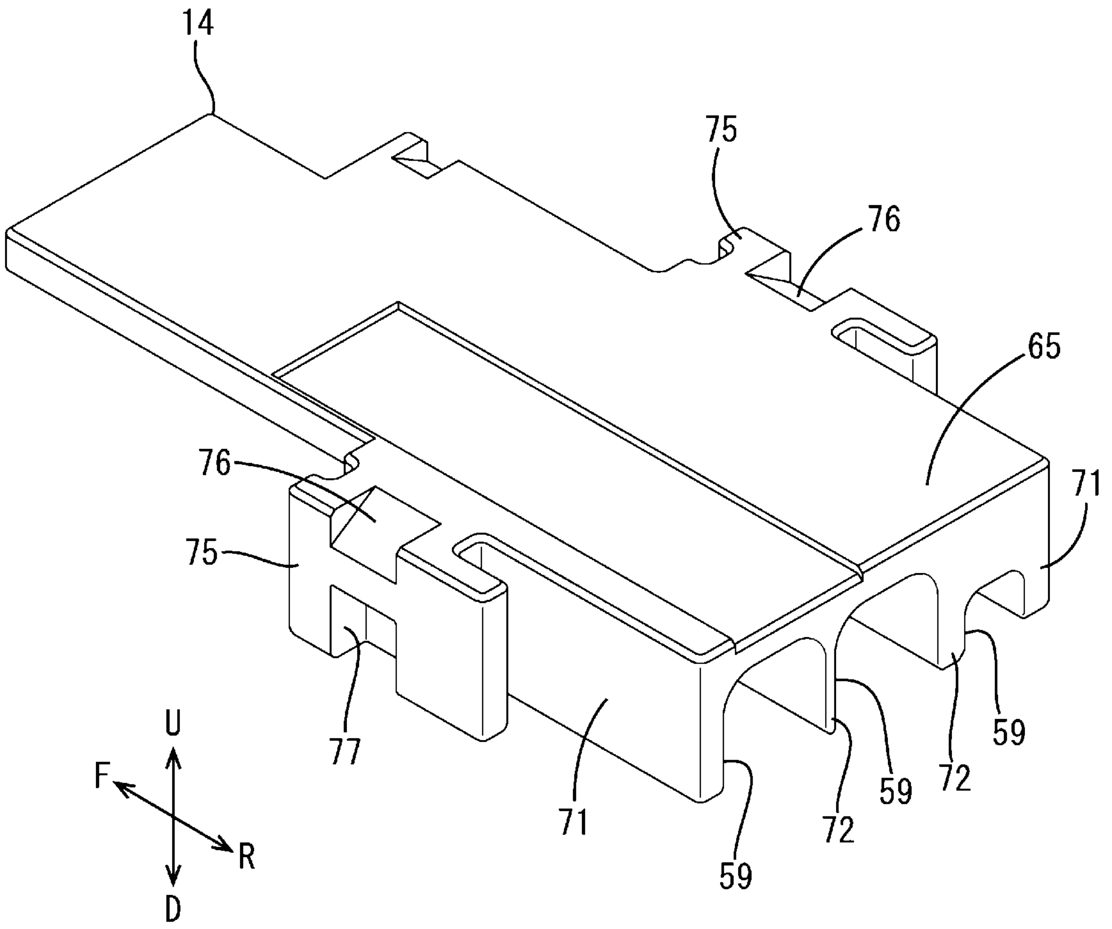
FIG. 12 is a perspective view of a lower inner member.

The lower inner member 14 is made from synthetic resin, and, as illustrated in FIG. 12, includes the lower base portion 65 having the shape of a flat plate, a pair of lower lateral walls 71 protruding downward from the left and right outer ends of the lower base portion 65, and a pair of left and right lower partition walls 72 that protrude downward from the center of the lower base portion 65 between the left and right sides. As illustrated in FIG. 6, the lower inner member 14 is attached to the inside of the housing 12, and is arranged between the terminal metal fittings 11 in the middle tier and the terminal metal fittings 11 in the lower tier. As illustrated in FIG. 12, three terminal housing chambers 59 arranged in the left-right direction are formed below the lower base portion 65, between the lower partition walls 72 and the lower lateral walls 71 and between the adjacent lower partition walls 72. As illustrated in FIG. 6, the lower sides of the terminal housing chambers 59 are closed off by a later-described cover wall 73 of the cover 15. The extension portions 18 of the terminal metal fittings 11 in the lower tier and the coated electric wire 250 (see FIG. 1 and FIGS. 3 to 5) connected to the general terminal are housed in the terminal housing chambers 59.

The upper surface of the lower base portion 65 is arranged so as to be capable of coming into contact with the lower end of the upper partition wall 64 along the front-rear direction. As illustrated in FIG. 6, the front end of the lower base portion 65 is arranged so as to be capable of coming into contact with a lower-tier wall surface 74 of the staircase portion 28 inside the fitting portion 24.

As illustrated in FIG. 12, a pair of left and right protruding portions 75 are formed so as to protrude from the lower lateral walls 71. The protruding portions 75 have the shape of quadrilateral blocks. Lower guide portions 76 having the shape of slopes are formed by chamfering the left and right outer ends of the upper surfaces of the protruding portions 75. Lower inner lock receiving portions 77 are formed below the lower guide portions 76 of the protruding portions 75. The lower inner lock receiving portions 77 have the shape of quadrilateral recesses, and are open toward the lower side of the lower lateral walls 71. As illustrated in FIG. 5, the lower inner lock receiving portions 77 can be locked to the lower inner lock portions 47.

Cover

Figure 13:
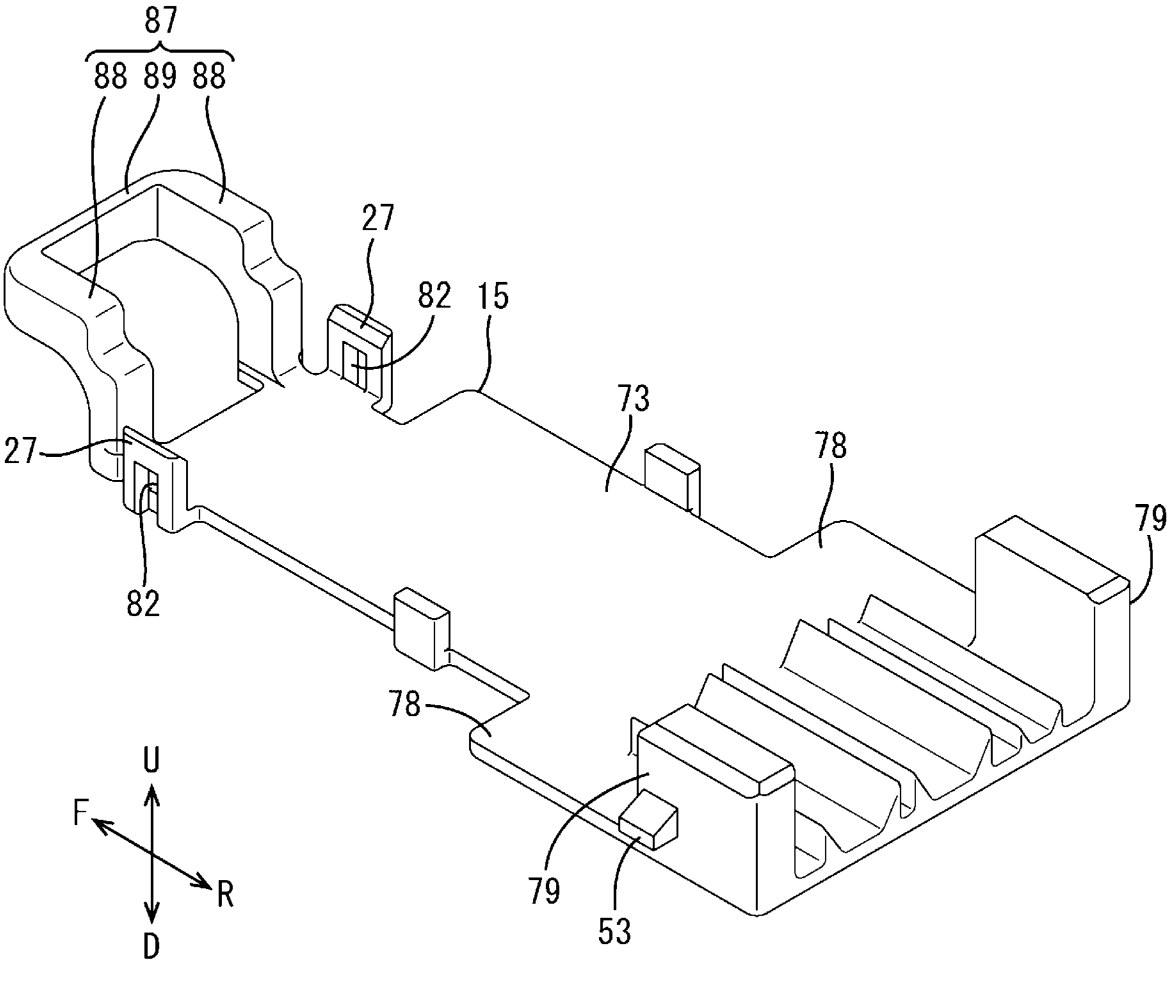
FIG. 13 is a perspective view of a cover.

The cover 15 is made from synthetic resin, and, as illustrated in FIG. 13, includes the cover wall 73 having the shape of a flat plate. The up-down-direction thickness (plate thickness) of the cover wall 73 is thinner than the up-down-direction thicknesses of each of the upper base portion 61 and the lower base portion 65. As illustrated in FIGS. 3 to 6, the cover wall 73 is fitted inside the housing main body 23 and the fitting portion 24 so as to cover the lower-surface openings in the housing main body 23 and the fitting portion 24. As illustrated in FIG. 5, the lower side of the cover housing portion 38 is closed off by the cover wall 73. As illustrated in FIG. 13, the rear side of the cover wall 73 includes a pair of left and right protruding pieces 78 that protrude laterally further than the front side of the cover wall 73 does. The protruding pieces 78 are arranged inside an inner space that is defined by the front surface portions 39 of the locking walls 36, and the rear surface portions 41, the top surface portions 42, and the lateral surface portions 43 in the cover housing portion 38 (see FIG. 3; see FIG. 9 in regard to the front surface portions 39 and the rear surface portions 41).

A pair of left and right lateral walls 79 protruding upward from the left and right outer ends of the protruding pieces 78 are formed in the cover wall 73. The lateral walls 79 have the shape of small plates extending along the front-rear direction and the up-down direction, and are arranged inside the housing main body 23 rearward of the protruding portions 75 of the lower inner member 14 and between the locking walls 36 and the lower lateral walls 71 in the cover housing portion 38 as illustrated in FIG. 3. Gaps between the lateral walls 79 and the locking walls 36 are smaller than gaps between the lateral walls 79 and the lower lateral walls 71. A pair of left and right locked portions 53 are formed so as to protrude from the outer surfaces of the lateral walls 79. The locked portions 53 have the shape of tabs that can fit into the locking holes 52 in the locking portions 51. Furthermore, as illustrated in FIG. 13, a pair of front-side locked portions 27 are formed so as to protrude upward from the left and right front side ends of the cover wall 73. The front-side locked portions 27 have the shape of rectangular frames, and are formed so as to be capable of deforming by bending in the left-right direction. As illustrated in FIG. 2, the front-side locking portions 26 of the housing 12 can fit into front-side locked holes 82 formed in the center of the front-side locked portions 27.

The cover 15 includes an excessive-bend-preventing portion 87 that protrudes upward from the cover wall 73. The excessive-bend-preventing portion 87 includes a pair of leg portions 88 that stand up from the left and right sides of the front end of the cover wall 73, and a bridge portion 89 that bridges the upper ends of the leg portions 88. The leg portions 88 have L-shapes in a lateral view, and are shaped so as to stand up from the cover wall 73 and then protrude toward the front. As illustrated in FIGS. 2 and 6, the excessive-bend-preventing portion 87 covers the lower end side (free end side) of the lock arm 25 from the front side and both lateral sides in a state in which the cover 15 is attached to the housing 12, and has the function of restricting the lock arm 25 from bending excessively.

Connector Assembly Method and Fitting Structure of Connector and Mating Connector First, a method for assembling the connector 10 will be described. Note that, preferably, the work for attaching components to the housing 12 described below is carried out in a state in which the up-down-direction orientation of the housing 12 is up-side-down relative to that when the connector 10 is installed, so that the inside of the housing 12 is open upward.

The terminal metal fittings 11 are connected to the terminal portions of the electric wires 200 in advance. In this state, the cylinder portions 17 of the terminal metal fittings 11 in the upper tier are inserted into the rear-side terminal insertion holes 33 (see FIG. 6). The front sides of the extension portions 18 of the terminal metal fittings 11 in the upper tier are fitted into the recesses 34 of the fitting portion 24 and inserted into the terminal housing chambers 59 of the housing main body 23. The terminal metal fittings 11 are positioned relative to the housing 12 by the protruding pieces 22 being fitted into the protruding-piece receiving portions 35 of the housing 12. The electric wires 200 connected to the terminal metal fittings 11 in the upper tier are drawn out toward the rear from the housing 12.

Subsequently, the upper inner member 13 is inserted into the housing 12. In the process of inserting the upper inner member 13, the upper inner lock portions 54 come into sliding contact with the upper guide portions 68. The upper inner member 13 is retained by the housing 12 by the front end portion of the upper base portion 61 coming into contact with the upper-tier surface 29 and the upper inner lock portions 54 being fitted inside the upper inner lock receiving portions 69 (see FIG. 4). The extension portions 18 of the terminal metal fittings 11 in the upper tier are sandwiched between the upper inner member 13 and the upper wall 37 of the housing main body 23, and are restricted from falling out from the corresponding terminal housing chambers 59 (see FIG. 6).

Subsequently, the cylinder portions 17 of the terminal metal fittings 11 in the middle tier are inserted into the terminal insertion holes 33 between the front and rear sides, and the extension portions 18 of the terminal metal fittings 11 in the middle tier are inserted into the terminal housing chambers 59 of the upper inner member 13. Next, the lower inner member 14 is inserted into the housing 12. In the process of inserting the lower inner member 14, the lower inner lock portions 47 come into sliding contact with the lower guide portions 76. The lower inner member 14 is retained by the housing 12 by the front end portion of the lower base portion 65 coming into contact with the middle-tier surface 31 and the lower inner lock portions 47 being fitted inside the lower inner lock receiving portions 77 (see FIG. 5). The extension portions 18 of the terminal metal fittings 11 in the middle tier are sandwiched between the upper inner member 13 and the lower inner member 14, and are restricted from falling out from the corresponding terminal housing chambers 59 (see FIG. 6).

Similarly, the cylinder portions 17 of the terminal metal fittings 11 in the lower tier are inserted into the front-side terminal insertion holes 33, and the extension portions 18 of the terminal metal fittings 11 in the lower tier are inserted into the terminal housing chambers 59 of the lower inner member 14. The entire general terminal is inserted into a general terminal insertion hole 84 (see FIG. 9) that is adjacent to the terminal insertion holes 33 inside the fitting portion 24. Next, the cover 15 is inserted into the housing 12. The rear part of the cover 15 is arranged inside the cover housing portion 38 of the housing main body 23. The lateral walls 79 of the cover 15 face the inner surfaces of the locking walls 36, and the locked portions 53 are fitted into and locked to the locking holes 52 in the locking portions 51 after the locking portions 51 are bent. At the same time, the front-side locking portions 26 are fitted into and locked to the front-side locked holes 82 in the front-side locked portions 27. Thus, the cover 15 is retained by the housing 12. The extension portions 18 of the terminal metal fittings 11 in the lower tier are sandwiched between the lower inner member 14 and the cover 15, and are restricted from falling out from the corresponding terminal housing chambers 59 (see FIG. 6). In such a manner, the assembly of the connector 10 is completed.

Next, the connector 10 is fitted to the mating connector 8. The mating connector 8 is fixed to the circuit board 100 above the roof panel 90, and is arranged so that the guide walls 9 pass through the inside of the opening 91 in the roof panel 90 (see FIG. 2) while the surface to be fit to the connector 10 is oriented downward.

The fitting portion 24 of the connector 10 is inserted into the guide walls 9 of the mating connector 8 from below. Once the connector 10 and the mating connector 8 are fitted to one another properly, the lock arm 25 locks the mating connector 8, and the connector 10 and the mating connector 8 are retained in the fitted state. The terminal metal fittings 11 and the general terminal are electrically connected to the corresponding mating terminal metal fittings 95 and tab inside the fitting portion 24.

In a state in which the connector 10 and the mating connector 8 are properly fitted to one another, the upper surface of the upper wall 37 of the housing main body 23 and the upper surfaces of the eaves portions 62 are arranged close to and facing the lower surface of the roof panel 90 as illustrated in FIG. 1.

Incidentally, because the roof panel 90 is a metal plate made from iron or the like, frost (film of ice) or dew may be formed on the lower surface side of the roof panel 90 in cold areas, etc. Electrical reliability decreases if water generated from frost or dew moves to the inside of the housing 12 and comes into contact with the portions where the terminal metal fittings 11 and the electric wires 200 are connected to one another. This being the case, in the case of present embodiment 1, the pair of eaves portions 62 are formed so as to protrude toward the left and right outer sides from the upper end of the housing main body 23. Furthermore, the hanging-down portions 86 are formed so as to protrude downward from the protruding ends of the eaves portions 62. Thus, water is allowed to freely fall along the left and right outer lateral surfaces of the hanging-down portions 86 from the upper surfaces of the eaves portions 62 without coming into contact with the outer surfaces of the locking walls 36 of the housing 12. Thus, the infiltration of water into the terminal housing chambers 59 from the outer surfaces of the locking walls 36 can be prevented, and electrical reliability between the terminal metal fittings 11 and the electric wires 200 can be ensured.

Furthermore, because the lateral walls 79 of the cover 15 are arranged inside the locking walls 36, and gaps between the locking walls 36 and the lateral walls 79 of the cover 15 are also located inside the cover housing portion 38, the upper surface of which is closed off by the top surface portions 42, the infiltration of water into these gaps can be avoided even if water comes into contact with the outer surfaces of the locking walls 36. Accordingly, the infiltration of water into the terminal housing chambers 59 can be more reliably prevented according to present embodiment 1. Furthermore, the infiltration of water into the lower-tier extraction hole 48 and the upper-tier extraction hole 55 can also be avoided.

As described above, according to present embodiment 1, the infiltration of water into the terminal housing chambers 59 can be prevented and waterproofness of the housing 12 can be ensured because the eaves portions 62 are formed so as to protrude laterally above the locking walls 36 locked to the cover 15. In addition, waterproofness of the housing 12 can be improved because the cover 15 is arranged inside the cover housing portion 38 of the housing 12, and thus a structure in which water does not readily infiltrate into gaps between the locking walls 36 of the housing 12 and the lateral walls 79 of the cover 15 is adopted.

Furthermore, water can be prevented from remaining on the upper surface of the upper wall 37 of the housing main body 23 because the upper surfaces of the eaves portions 62 are continuous with the upper surface of the upper wall 37 without any level differences. Moreover, because the hanging-down portions 86 are formed so as to protrude downward from the eaves portions 62, a structure is realized in which water falling from above is less likely to infiltrate into the terminal housing chambers 59, and the waterproofness of the housing 12 can be improved to a further extent.

Other Embodiments of Present Disclosure

Embodiment 1 disclosed herein is an example in every way, and shall be construed as being non-limiting.

In the case of above-described embodiment 1, the housing is formed so that the upper inner member and the lower inner member can be separated from the housing. However, the housing may be formed integrally with portions corresponding to the upper inner member and the lower inner member so that such portions cannot be separated from the housing.

In the case of above-described embodiment 1, the eaves portions are formed so as to protrude toward the left and right outer sides from the upper end of the housing main body. However, it is sufficient that the eaves portions be formed so as to protrude from the upper end of the housing main body in a direction that intersects the up-down direction (laterally), and may for example include portions that protrude toward the rear from the upper end of the housing main body. Furthermore, an eaves portion may be formed so as to protrude laterally from the upper end of the housing over the entire circumference.

In the case of above-described embodiment 1, the eaves portions are formed so as to be flat along the front-rear direction and the left-right direction. However, the eaves portions may be formed in the shape of curved surfaces or slopes, and may for example be shaped to urge water to fall by inclining the outer surfaces of the left and right outer end portions downward. The hanging-down portions may be inclined as well.

In the case of above-described embodiment 1, the housing includes the hanging-down portions protruding downward from the eaves portions. However, the hanging-down portions may be omitted from the housing depending on situation.

In the case of above-described embodiment 1, a connector that is arranged below a roof panel was described as an example. However, the present disclosure is widely applicable to connectors for use in environments in which water can fall down onto the connectors from above, without limitation to above-described embodiment 1.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector comprising:

a housing main body which includes a terminal housing chamber and an upper surface of which is closed off;

a terminal metal fitting that is housed inside the terminal housing chamber;

a cover that is locked to the housing main body and arranged below the terminal housing chamber; and an eaves portion that protrudes laterally from an upper end of the housing main body, wherein the housing main body includes a pair of locking walls, a cover housing portion having an upper surface which is closed off is formed between the pair of locking walls in the housing main body, and the cover is arranged inside the cover housing portion, and includes lateral walls that face inner surfaces of the locking walls and that are locked to the locking walls.

2. The connector according to claim 1, wherein the connector is a connector that is provided to a roof panel of a vehicle, and the eaves portion is arranged along a lower surface of the roof panel.

3. The connector according to claim 1, wherein the eaves portion is shaped so as to protrude laterally further than a locked portion where the housing main body and the cover are locked to one another does, above the locked portion.

4. The connector according to claim 3, wherein an upper surface of the eaves portion is continuous with the upper surface of the housing main body without any level differences.

5. The connector according to claim 1 further comprising:

a hanging-down portion that protrudes downward from a laterally-protruding end side of the eaves portion.

6. The connector according to claim 5, wherein an upper portion of a space between the hanging-down portion and one of the locking walls is closed off by the eaves portion.

7. A connector comprising:

a housing main body which includes a terminal housing chamber and an upper surface of which is closed off;

a terminal metal fitting that is housed inside the terminal housing chamber;

a cover that is locked to the housing main body and arranged below the terminal housing chamber; and an eaves portion that protrudes laterally from an upper end of the housing main body, wherein the connector is a connector that is provided to a roof panel of a vehicle, and the eaves portion is arranged along a lower surface of the roof panel.

* * * * *